April 2, 1963     T. P. C. BREUERS ET AL     3,083,959
DEVICE FOR SEPARATING BY MEANS OF FRICTION TWO SUPERIMPOSED
SHEETS OF LAMINAR MATERIAL
Filed Jan. 27, 1961
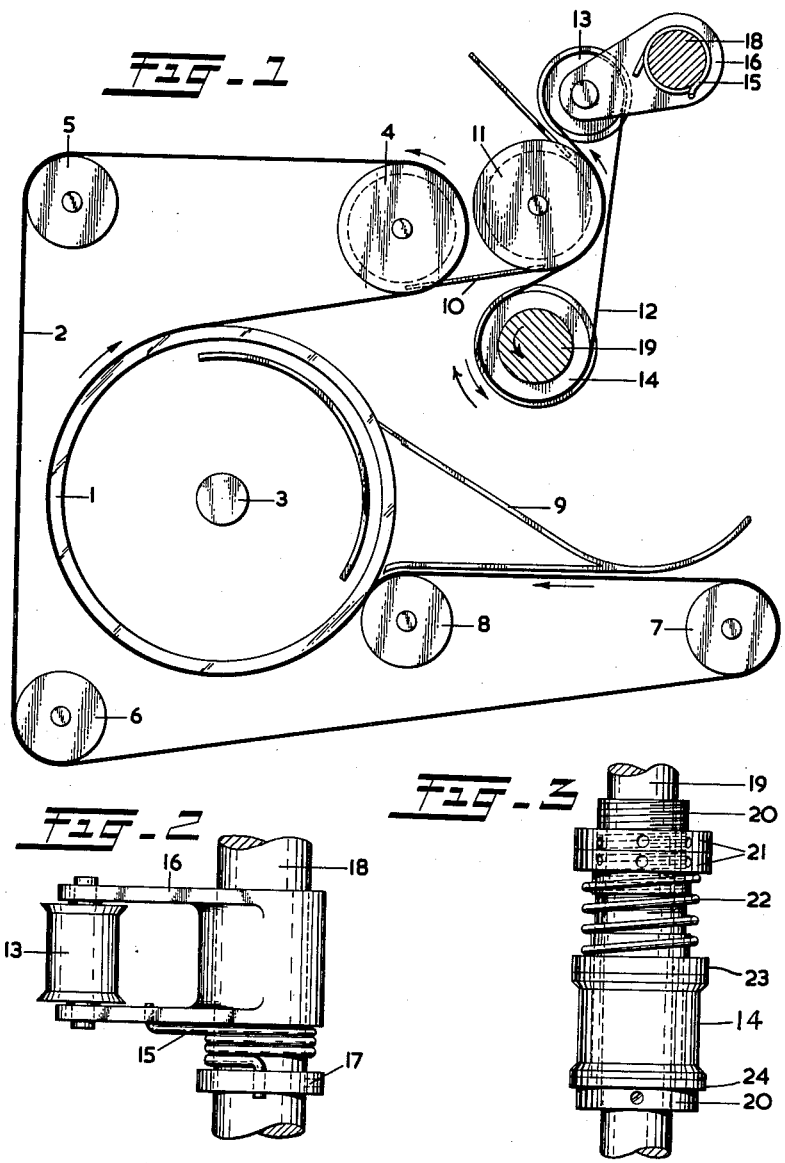
INVENTORS
THEO PIERRE CHRETIEN BREUERS
MARTIN DOMINICUS PIERRE SWENKER
BY
ATTORNEY 3,083,959
DEVICE FOR SEPARATING BY MEANS OF FRICTION TWO SUPERIMPOSED SHEETS OF LAMINAR MATERIAL
Theo Pierre Chrétien Breuers and Martin Dominicus Pierre Swenker, Venlo, Netherlands, assignors to Chemische Fabriek L. van der Grinten N.V., Venlo, Netherlands, a Dutch corporation
Filed Jan. 27, 1961, Ser. No. 85,326
Claims priority, application Netherlands Feb. 2, 1960
4 Claims. (Cl. 271—18)

The invention relates to a device for separating by means of friction two superimposed sheets of laminar material travelling in their own plane, such as paper, tracing paper, tracing films, and the like, said device comprising a driving mechanism for the sheets, a driven conveyor means mounted behind it, as seen in the direction of movement of the sheets, and a movable friction means cooperating under pressure with the conveyor means and acting upon the sheets, the cooperating parts of which means move along closed tracks and between which means the laminar material is fed by the driving mechanism, the direction of movement of the friction means being dependent on the possible passage through the device of at least one sheet of laminar material, and the friction between the friction means and the laminar material and the friction between the conveyor means and the laminar material being greater than the friction between two sheets of laminar material.

German patent specification No. 1,012,824 describes a continuously operating photoprinting apparatus equipped with a device of this type. This device contains a driving mechanism consisting of two rollers bearing against each other and a conveyor belt cooperating with them, which drives the exposure set (laminar original and sheet of photoprinting paper) to a conveyor roller and a friction roller resting thereon. The friction roller, which with a view to the separation of the original from the photoprinting paper, is adapted to rotate contrary to the direction of movement of these sheets, at first acts as a guiding roller, for which it rotates in the direction of movement of the sheets; this movement, however, is converted into a counter-rotating movement as soon as a certain leading part of the exposure set, after having moved over the roller, reverses the drive of the roller by means of a feeler. Since the sheets are driven towards the roller by the driving rollers and the conveyor roller helps to drive the photoprinting paper, the original is upset by the resistance of the friction roller and in consequence is doubled in the form of a loop and then guided in a different direction from the photoprinting paper.

This known device has the disadvantage of a complicated construction. Moreover both sheets may be "rubbed back" by the counter-rotating friction roller if the photoprinting paper projects farther beyond the original than the distance between friction roller and feeler. The device according to the present invention does not have these disadvantages; it enables a reliable separation of two superimposed sheets of laminar material, even if one of the sheets has an edge projecting far beyond the other sheet. For this purpose it is fitted with continuously operating driving means for the friction means and with slip clutch means between the driving means and the friction means, said driving means continuously tending to drive the friction means via the slip clutch means in a direction opposite to the direction in which the friction means is influenced by the conveyor means. To ensure reliable operation it is naturally necessary for the construction of the device to be adapted to the nature of the materials to be separated.

Generally speaking it has to be constructed in such a way that the friction between the conveyor means and the laminar material is greater than the friction between the material and the friction means. The driving force which is exerted on the friction means via the slip clutch means has to be smaller than the driving force exerted by the conveyor member on the friction means if no laminar material is present between the conveyor means and the friction means, but if on the other hand laminar material is present between the conveyor member and the friction means, such driving force has to be greater than the driving force exerted by the conveyor means on the friction means via this material.

If, in a device of such construction according to the invention, no laminar material is present between the conveyor means and the friction means, the friction means is driven by the conveyor means. The parts of the conveyor means and friction means which bear against each other then move in the same direction. The slip clutch means between the driving means and the friction means will then slip.

However, if laminar material gets between the conveyor means and the friction means, so that the two means are no longer in contact with each other, the driving force which the conveyor means exerts (via the laminar material) on the friction means is determined by the nature of this laminar material. If the latter is smooth (such as paper, for instance), this force is only small in comparison with the driving force exerted by the driving means via the slip clutch means. The friction means is then driven via the slip clutch means in a direction opposite to that of the movement of the conveyor means.

If only one sheet of laminar material gets between the conveyor means and the friction means, this sheet is taken along by the conveyor means against the force of friction which is exerted by the friction means on the side of the sheet that is turned toward this means.

If two loosely superimposed sheets of paper, tracing paper, cellulose acetate film and the like, or combinations of sheets of these materials get between the conveyor means and the friction means, the sheet nearest to the conveyor means is taken along by the conveyor means. The other sheet comes into contact with the friction means. The force exerted by the driving means on the friction means via the slip clutch means and the friction between this means and the other sheet being greater than the friction between the two sheets, the second sheet is arrested by the friction means and rubbed back and thus separated from the first sheet.

If the sheet which is turned towards the conveyor means has a leading edge projecting a few centimetres, for instance, beyond the other sheet, the friction means will already be moving in the opposite direction when the second sheet, which lags behind, reaches this means. The second sheet is then arrested by the friction means and, in consequence of the continuous feed by the driving mechanism, which leads the sheets to the zone between the conveyor member and the friction means, is doubled in the form of a loop and thus separated from the first sheet. If the sheet which is turned towards the friction means has an edge projecting beyond the other sheet, this edge is at first gripped and fed further by the conveyor means, while the friction means, the direction of movement of which has changed in the meantime, rubs across the other side of it. When the other sheet (lagging behind) has moved so far that it has entered the zone of pressure between the conveyor means and the friction member, the conveyor means will no longer influence the projecting sheet directly. The projecting sheet is then rubbed back by the friction means.

The surfaces of various laminar materials naturally are not all equally smooth and equally even. The value of the forces exerted on the surfaces of the sheets by the conveyor means and the friction means and that of the friction between the sheets are dependent on the greater or smaller degree of smoothness and evenness of those surfaces.

The pressure under which the conveyor means and the friction means cooperate and the couple produced by the slip clutch means have to be adapted to the forces and the frictions occurring during the separation of particular sets on the surfaces of the sheets of which those sets are composed.

If the device has to serve for the successive separation of sets of different composition, it will preferably contain means for changing the couple produced by the slip clutch means as well as the pressure between the friction means and the conveyor means.

As a rule the conveyor means is a roller, an endless belt passing round rollers, or a system of juxtaposed endless belts.

The friction means may also be a roller or a shaft on which a number of discs are mounted. It may also be an endless belt which has been tensioned round some guiding rollers and rests some distance against the conveyor means. One of the guiding rollers can be driven via a slip clutch.

In a preferred embodiment according to the invention the friction means is composed of a number of independently operating parallel tensioned endless belts passing at short intervals round rollers, each belt being driven via a slip clutch. This device has the advantage that even the sheets from sets travelling side by side in echelon can thus be separated from each other in a reliable way. Such a construction is especially attractive for application in apparatus with a great operating width (120 cm., for instance), through which sets of sheets of smaller width are passed simultaneously and side by side.

Moreover it is possible to bring the belts forming the friction means into contact with the conveyor member over some distance along their circumference.

This has the advantage that a large force of friction is obtained at a comparatively small pressure. Wear of the members owing to deformation of their surfaces is thus minimized. Moreover the friction per unit of area need only be small. This is especially attractive when sheets that may be damaged by friction (tracings made by pencil, typed letters and the like) are to be handled.

The driving mechanism, which drives the sheets to be separated towards the conveyor means and the friction member and thus exerts the upsetting forces, which help to bring about the separation, on the sheets which have been "rubbed back," of course has to be mounted at such a short distance from the conveyor means and friction means that the sets of sheets have already got between conveyor means and friction means with their leading edge when their lagging part is still being influenced by the driving mechanism. If sets of sheets of different dimensions have to be separated by means of the device, the distance between driving mechanism and friction means—conveyor means will preferably be so chosen that even the smallest of these sets can still be handled.

In devices according to the invention the friction means and conveyor means are therefore preferably mounted in such a way that the distance between these means and the driving mechanism amounts to at most 20 cm.; with such a construction sets of sheets of size DIN A5 may still be separated in a reliable way.

The driving mechanism may consist of two driven rollers bearing against each other under pressure, endless belts, and the like. If the device forms part of an apparatus for handling the sets of sheets, a part of this apparatus may often serve as driving mechanism. Thus, if the device forms part of a photoprinting apparatus, the rotating exposure cylinder and the system of conveyor belts by means of which the exposure sets are forced against the cylinder may act as a driving mechanism.

One embodiment of apparatus according to the invention is illustrated in the accompanying drawings, in which:

FIGURE 1 is a diagrammatical cross-section of a continuously operating exposure apparatus which is equipped with a device according to the invention.

FIGURE 2 is a top view on a larger scale of the part of this device which serves to tension the friction belts.

FIGURE 3 is a view, on the same scale as FIGURE 2, of the slip clutch which is applied in the device.

In FIGURE 1, the numeral 1 designates a rotatably mounted exposure cylinder, 2 a system of narrow juxtaposed endless conveyor belts, by means of which the exposure set, consisting of a sheet of light-sensitive photoprinting material, such as diazotype paper, and a laminar original, such as a drawing on tracing paper or a letter on translucent paper, is fed around the cylinder 1 and the tubular lamp 3, such as a high-pressure mercury vapour lamp, mounted therein. The conveyor belts 2 pass round cylinder 1 and the rollers 4, 5, 6, 7 and 8 in the direction indicated by the arrows. Air is sucked into the apparatus between the belts so that photoprinting material which is fed through the apparatus will, after having left the cylinder, remain in contact through suction with the parts of conveyor belts 2 extending to roller 4. In many cases the original, when leaving cylinder 1 (owing to gravity, for instance) will be disengaged from the light-sensitive material, and fall into collecting tray 9. However, if the original has an edge projecting beyond the light-sensitive material, it will also remain in contact with the conveyor belts through suction. The original may also be taken along together with the light-sensitive material by the conveyor belts 2 through a different cause, such as static electricity. Roller 4 is fitted with circumferential grooves. Between the conveyor belts, strippers 10 reach into these grooves. The other ends of the strippers 10 reach into similar grooves of the driven conveyor roller 11.

The rates at which the conveyor belts 2 and the surfaces of cylinder 1 and roller 11 are moving are equal.

Bearing against roller 11 at short intervals (15 cm. apart, for instance) are a number of narrow endless belts 12, which together form the friction means. Each belt 12 passes round roller 11, a roller 13, and a roller 14. The tension in each belt 12 is obtained with the aid of a spring 15 which is mounted between a bridge 16, in which roller 13 is supported in bearings, and an adjusting ring 17 (see FIGURE 2) on bar 18. Each roller 14 is a part of a slip clutch system which is mounted on the driven shaft 19. The direction of rotation of shaft 19 is the same as that of roller 11. Each slip clutch system (see FIGURE 3) consists of a sleeve 20, rigidly secured on shaft 19, nuts 21, spring 22, friction discs 23 and 24, and roller 14. When by means of the nuts 21 spring 22 is compressed, the latter in turn forces the friction discs 23 and 24 against the ends of roller 14. The friction discs are made of wear-resistant material, such as brake lining, like the product "Ferodo S.R.A." of S.A.F. du Ferodo, Paris, France.

The construction of roller 11 and the belts 12 of course has to be adapted to the nature of the material to be handled. In order to ensure good conveyance, roller 11 is preferably given a high-friction surface. In the device as illustrated roller 11 has been fitted with a rough cover of "Vulkollan" (polyurethane of Bayer A.G., Leverkusen, Germany).

Other wear-resistant and elastic materials (such as rubber) may also be used. Roller 11 may also be a hollow roller fitted with an air-transmitting cover. If air is sucked away from the inside of the roller, it is able to exert a considerable conveying force on the laminar material coming into contact with it.

In order to ensure that the friction between the friction means and the laminar material shall be less than that between the conveyor means and the laminar material, the friction belts have been made of a soft and wear-resistant material giving rise to less friction, such as polythene. The difference in friction is increased even more because the laminar material in the device is in contact with the conveyor means over a larger area than with the friction means.

In the device described above two opposing forces are exerted on the belts 12; one by conveyor roller 11, the other (via the slip clutch) by shaft 19.

By the tensioning of the springs 15 and 22 the device is adjusted in such a way that the driving force which roller 11 exerts on each belt 12 is greater than the driving force which shaft 19 exerts on it via the slip clutch. If there is nothing between roller 11 and the belts 12, the belts 12 are taken along by roller 11. Roller 14 will then slip between the friction discs 23 and 24 on shaft 19.

A sheet of light-sensitive material which has left cylinder 1 (when the original has already fallen from it) is driven by cylinder 1 and belt system 2 and gets between roller 11 and the belts 12. This sheet is then gripped by roller 11 and carried further. The surfaces of the sheet and the surfaces of the belts 12 being much smoother than the surface of roller 11, the driving force which is now exerted by roller 11 via the sheet on the belts 12 is smaller than the driving force which is transmitted by shaft 19. The belts are then driven by shaft 19 via the slip clutch and their direction of movement is reversed. While the sheet is being carried further by roller 11, the belts move in the opposite direction and in doing so rub across the side of the sheet that is turned towards them, but without preventing its movement.

If both sheets of the exposure set get between roller 11 and belts 12, the light-sensitive sheet coming into contact with roller 11 is carried further.

The original is rubbed back by the belts 12, of which the direction of movement is again contrary to that of the sheets. In order to ensure that this rubbing-back shall take place with certainty, the force which is exerted by the belts 12 has to be sufficient to overcome the friction between the two sheets. By adjustment of the tension in the springs 15 and 22 the situation is obtained in which for the separation of sets of a particular composition the proportion between the acting forces is correct. If sets of different composition have to be separated successively, each time a fresh adjustment of the spring tension may be necessary. Devices which have to serve for this purpose may be fitted with an adjusting handle with a calibration for certain frequently occurring compositions of sets of sheets. Such an adjusting handle is naturally connected with the nuts 21. If desired, the pressure between belts 12 and roller 11 may also be made adjustable by fitting an adjusting handle which is connected with the shaft 18, by whose rotation the tension on the belts 12 can be changed.

It has, however, been found that a change of the tension of the belts is necessary only if the sets to be separated successively differ considerably in composition. Many sets which are alternately composed of the light-sensitive materials (such as diazopaper, diazolinen, tracing paper, tracing film and the like) and originals (such as tracings, letters, film positives and the like) commonly used in the photoprinting technique, can be separated by means of a device according to the invention without the adjustment of the device having to be changed.

The sheet rubbed back by the belts 12 is upset owing to the driving action of cylinder 1 and belts 2, between which the lagging part of the sheet is still gripped. It is then disengaged from the other sheet and falls into the collecting tray 9. The device described above operates in a very reliable way, even if the original has an edge projecting beyond the other sheet. In such a case the projecting part of the original will at first, when it gets between roller 11 and belts 12, be taken along by roller 11 because of the great friction of this roller. However, when the light-sensitive sheet has been carried so far that it has got between roller 11 and the original, roller 11 will no longer influence the original. The original is then rubbed back by the belts 12, which in the meantime have started to move in the opposite direction.

In order to ensure a reliable separation even in cases in which the original has an edge projecting very far beyond the other sheet, it is advisable to choose the speed of rotation of shaft 19 so high that the speed of movement of the belts 12, when they are driven by shaft 19, is greater than the speed of movement of the cover of roller 11.

In the embodiment of the invention described above the path which is traversed by the sheets between the driving mechanism and the cooperating conveyor means and friction means is practically horizontal, while the sheet to be detained lies against the lower side of the other sheet. The device according to the invention may also be constructed in such a way that the said path slants or even runs vertically upwards or downwards, while in embodiments with a path that is more or less horizontal the uppermost instead of the lowermost sheet may be arrested.

In the embodiment of the invention described above the arrested sheet (the original) after the separation takes a different direction from the sheet that is fed through, viz. towards collecting tray 9. It is guided in that direction under the influence of gravity. In other embodiments other means may also be applied to guide the arrested sheet in a different direction.

The device according to the invention may also be constructed in such a way that the arrested sheet after the separation from the other sheet takes the same direction as the latter.

We claim:

1. Device for separating by means of friction two superimposed sheets of laminar material, travelling in their own plane, said device comprising a driving mechanism for the sheets, driven conveyor means mounted behind it, as seen in the direction of movement of the sheets, and movable friction means cooperating under pressure with the conveyor means and acting upon the sheets, the cooperating parts of which means move along closed tracks and between which means the laminar material is fed by the driving mechanism, the friction means being driven frictionally by the conveyor means in the direction of movement of the latter in the absence of at least one sheet of laminar material between those means, and the friction between the friction means and the laminar material and that between the conveyor means and the laminar material being greater than the friction between two sheets of laminar material, continuously operating driving means for the friction means and slip clutch means between the said driving means and the friction means, said driving means continuously tending to drive the friction means via the slip clutch means in a direction opposite to the direction in which the friction means is influenced by the conveyor means, the slip clutch means normally being over-ridden by the driving force of the conveyor means on the friction means but being operative to transmit the action of said driving means to the friction means in the presence of at least one sheet of the laminar material between the friction means and the conveyor means.

2. A device according to claim 1, wherein means are included for changing the couple produced by the slip clutch means and the pressure between the friction means and the conveyor means.

3. A device according to claim 1, wherein the friction means is composed of a plurality of independently operating parallel tensioned endless belts, passing around rollers, each belt being driven via a slip clutch.

4. A device according to claim 1, wherein the friction means and the conveyor means are mounted at a distance of at most 20 cm. from the driving mechanism.

References Cited in the file of this patent

UNITED STATES PATENTS

| 1,850,932 | Holms | Mar. 22, 1932 |
| 1,955,066 | Hiller | Apr. 17, 1934 |
| 2,936,170 | Herrick et al. | May 10, 1960 |
| 2,947,539 | Brevers et al. | Aug. 2, 1960 |